United States Patent [19]
Litchford

[11] Patent Number: 4,789,865
[45] Date of Patent: Dec. 6, 1988

[54] COLLISION AVOIDANCE SYSTEM

[75] Inventor: George B. Litchford, Northport, N.Y.

[73] Assignee: Litchstreet Co., Northport, N.Y.

[21] Appl. No.: 111,812

[22] Filed: Oct. 21, 1987

[51] Int. Cl.$^4$ .......................... G01S 3/02; G08G 7/02
[52] U.S. Cl. ...................................... 342/455; 342/29; 342/32; 364/461
[58] Field of Search ...................... 342/455, 29, 30, 32, 342/41, 46, 40, 39; 364/461

[56] References Cited

U.S. PATENT DOCUMENTS

| | | |
|---|---|---|
| Re. 29,260 | 6/1977 | Litchford . |
| 3,866,163 | 2/1975 | Litchford . |
| 3,875,570 | 4/1975 | Litchford ........................ 341/455 X |
| 3,887,916 | 6/1975 | Goyer . |
| 3,895,382 | 7/1975 | Litchford ........................ 342/455 X |
| 3,900,867 | 8/1975 | Wagner . |
| 3,921,172 | 11/1975 | Litchford ........................ 342/455 X |
| 3,959,793 | 5/1976 | Litchford ........................ 342/455 X |
| 4,021,802 | 5/1977 | Litchford ........................ 342/455 X |
| 4,027,307 | 5/1977 | Litchford ........................ 342/455 X |
| 4,104,629 | 8/1978 | Isbister et al. . |
| 4,115,771 | 9/1978 | Litchford . |
| 4,128,839 | 12/1978 | McComas ........................ 342/455 |
| 4,167,006 | 9/1979 | Funatsu et al. ................. 342/455 X |
| 4,191,958 | 3/1980 | Hulland et al. . |
| 4,196,434 | 4/1980 | Funatsu et al. ................. 342/455 X |
| 4,361,202 | 11/1982 | Minovitch ..................... 180/168 |
| 4,454,510 | 6/1984 | Crow .............................. 342/456 X |
| 4,486,755 | 12/1984 | Hulland et al. ................. 342/455 X |
| 4,642,648 | 2/1987 | Hulland et al. ................. 342/455 |

Primary Examiner—Theodore M. Blum
Assistant Examiner—John B. Sotomayor
Attorney, Agent, or Firm—Henry S. Huff

[57] ABSTRACT

The operation of a positive finding collision avoidance system at an Own station that determines Own's and Others' positions from SSR interrogations and replies thereto is initialized by briefly transmitting interrogations from Own station and receiving non-garbled replies thereto from Other stations to determine their direct ranges from Own. The range data is used in a trigonometric computation to obtain Own's and such Others' initial positions. Interference with the normal operation of the standard ATCRBS is limited to a minimum by transmitting from Own very briefly and only when necessary. The distance between pairs of SSRs is also computed.

14 Claims, 3 Drawing Sheets

COLLISION AVOIDANCE SYSTEM

BACKGROUND OF THE INVENTION

This invention relates to collision avoidance systems for vehicles such as aircraft, and more particularly to improvements on the invention described and claimed, in U.S. Pat. No. 4,768,036 issued in the names of George B. Litchford and Burton L. Hulland, entitled Collision Avoidance System.

The earlier invention provides methods of and means for repeatedly determining the positions of Own and Other transponder-equipped craft within the common service areas of two or more identified SSRs at known locations utilizing standard ATCRBS interrogations and replies thereto received at Own station. To initiate operation, Own's current position must be known or determined. This may be done by use of a trial and error method such as a Simplex algorithm, as described in U.S. Pat. No. 4,768,036. Such method enables completely passive operation, with no radio transmissions other than those already present in the normal operation of ATCRBS.

SUMMARY OF THE INVENTION

According to the present invention, Own station's initial position is established from the active measurement of the range to available Other station transponders whose successive replies to Owns's interrogations are those which are free of interference caused by overlapping replies. Such interference is commonly denoted as "garble". Garble-free replies are selected to enable determination of identity and altitude of the Others, and their delays with respect to the interrogations that elicited them are measures of the direct ranges of the Others from Own. To provide assurance of range measurement to an identified Other, Own transmits a brief burst of repetitive Mode A and Mode C interrogations and correlates the resulting received replies.

More than one Other transponder may reply free of garble. In such event, the one most favorably disposed for accurate determination of Own's and Other's positions is selected. No sequence of approximations of Own's position is required as disclosed in U.S. Pat. No. 4,768,036. Any interference to the existing ATCRBS by Own's interrogations and replies thereto is transitory and essentially negligible. The positions of Own and the replying Other stations are determined trigonometrically from the measured ranges Y and the differential azimuths A and differential times of arrival T of interrogations from the SSRs and the non-garbled successive replies thereto from the aforementioned identified Other transponders. After Own's position is determined using active transmissions combined with passive data, then relative positions of Other transponder stations are derived only passively as described in U.S. Pat. No. 4,768,036.

DESCRIPTION

Figure 1:
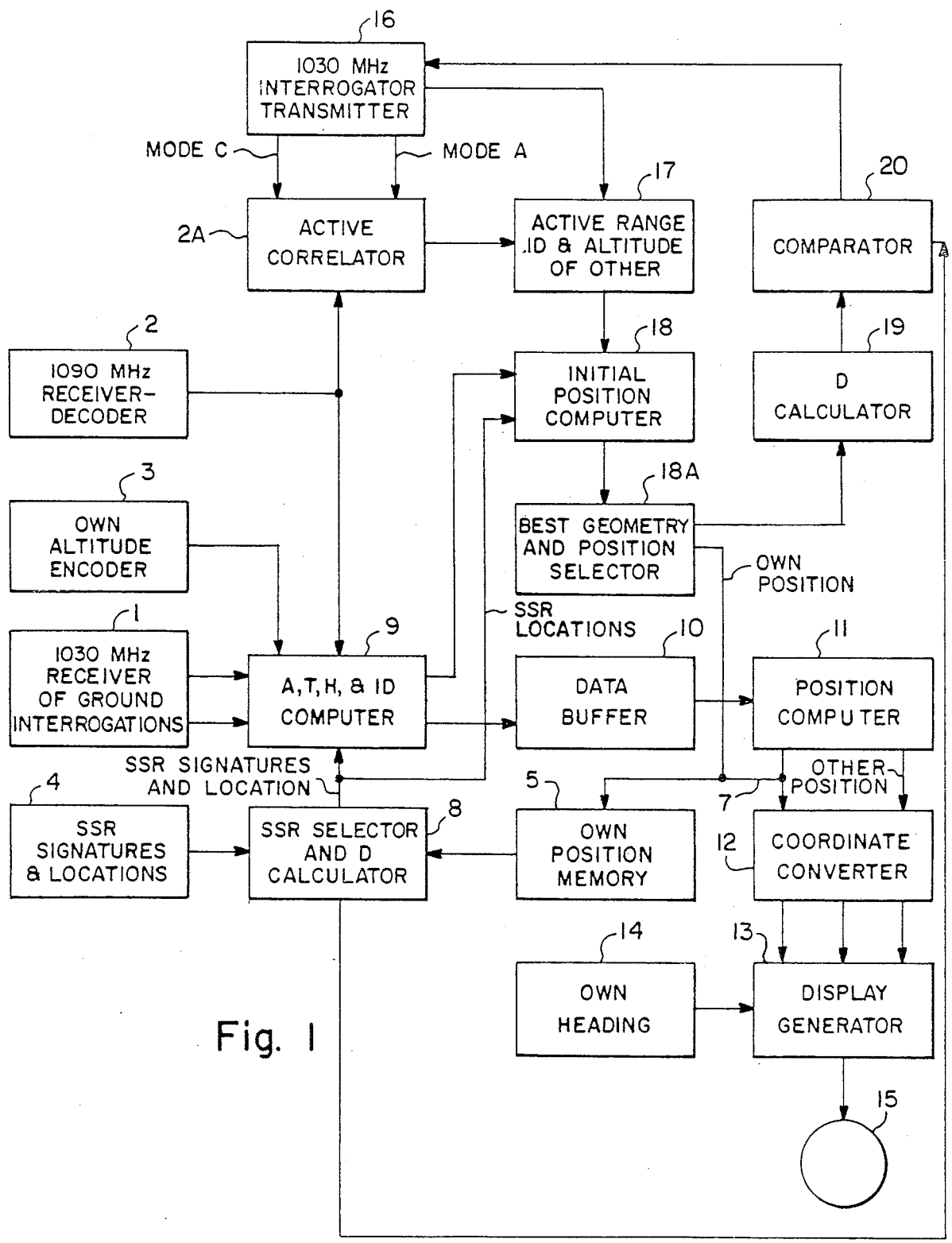
FIG. 1 is a block diagram of a preferred embodiment of the invention.

Referring to FIG. 1, the equipment at an Own station, typically aboard an aircraft, another vehicle, or at an initially unknown ground location, includes a 1030 MHz receiver 1 adapted to receive and decode conventional SSR interrogations. It is arranged to provide an output pulse upon the decoding of a P3 pulse of a P1-P3 pair of each received interrogation. When no SSR beam is pointed at Own, synthetic P3 pulses are provided as described in U.S. Pat. No. 4,021,802. A 1090 MHz receiver 2 is adapted to receive all the reply signals of any other transponders within its range, providing pulse outputs corresponding to such replies. An altimeter encoder 3 provides an output representing Own's altitude.

A storage device 4, preferably a non-volatile device such as a read-only memory (ROM), contains an organized listing of all SSRs that might be used with the system, including the signature and geographical location of each. The signature of an SSR is the distinctive combination of main beam rotation period (P) and pulse repetition characteristic (PRC) assigned to that particular SSR.

A storage device 5 is adapted to retain data defining Own's most recently determined position, and to replace said data with revised or updated data when supplied on line 7. The current Own's position data is supplied to an SSR selector and D calculator 8, which includes data comparison means arranged in known manner to select, on the basis of their positions as stored in device 4 and Own's position, all SSRs within say 100 miles of Own's position. The selection window may be adjustable, and may be designed to select up to, for example, five of the most favorably located SSRs. The signatures and locations of the selected SSRs are supplied to the A, T, H and ID computer 9.

The SSR ground interrogation-related pulses from the receiver 1, the Other's replies thereto from receiver 2, and encoded Own's altitude from altimeter encoder 3, are also applied as inputs to computer 9, which may be as shown and described in U.S. Pat. No. 4,021,802, with reference to FIG. 3 thereof, specifically the elements designated therein by reference numerals 301-304 and 306-319. The PRC selectors corresponding to elements 301 and 304 of said patent are adjusted by the SSR selector and D calculator 8 to accept the interrogations of the selected SSRs and the replies elicited thereby.

The computer 9 operates in the manner described in the '802 patent to produce output data representing the differential time of arrival T, the differential azimuth A, and differential altitude H, of each Other station with respect to Own, in association with the identity of the Other and the identity and location of the SSR from which it was obtained. Such data will appear serially in separate bursts, in a sequence that depends on the positions of the participating stations and the locations and rotation periods of the SSRs.

The data from computer 9 is stored as it becomes available in a buffer device 10, which comprises a group of registers, each arranged to store associatively the A, T, and H data relating to an identified Other station, with said Other's identity and the identity and location of the SSR from which it was obtained. As each such set of data is completed, the buffer 10 presents it to a position computer 11. When the computer 11 has completed any currently ongoing calculation and is free to do so, it accepts the presented data set and releases the respective buffer register for accumulation of another set.

The computer 11 may be a general purpose computer or a dedicated device, programmed as a Kalman filter, for example, whose outputs update Own's and Other's positions in response to each new data set. The Own's and Other's positional data, which may be in latitude-longitude format, are applied to a coordinate converter 12 of a known type. The converter produces outputs representing ranges and bearings of identified Others from Own. A display generator 13, also of known type, uses said outputs to produce signals for controlling a display device 15, such as a cathode ray tube, to exhibit Other's range, bearing and altitude, relative to Own, of identified Other stations. Own's heading, obtained from a device 14 such as a compass, may also be applied to the generator 13 to orient the display with respect to Own's heading.

A 1030 MHz transmitter 16 includes an interrogation encoder similar to that of a standard SSR but arranged to provide brief bursts each containing at least three pairs of alternating Mode A (identity) and Mode C (altitude) interrogations. Transmitter 16 if in an aircraft may be activated automatically after takeoff during climbout, when Own craft reaches an altitude of 500 feet, for example. The bursts of interrogations may be repeated, if necessary, at intervals of about one second, for example, with a repetition period substantially longer than that assigned to any standard SSR. In other words, the interrogations use a signature and repetition rate substantially different from that of any SSR. With each interrogation, the transmitter 16 applies a timing pulse to an active range computer 17.

Decoded replies received by the 1090 MHz receiver 2 are applied to computer 17 by way of an active correlator 2A of known type, similar to that used in SSR ground receiving equipment, which rejects garbled replies and passes only those successive replies wherein at least two identity replies and two altitude replies correlate on a pulse to pulse basis with the combined Mode A and Mode C interrogations from transmitter 16, and are delayed with respect thereto by the same intervals. Such replies include the identity and altitude of any non-garbled Other station, and are delayed with respect to the corresponding interrogations by intervals proportional to the direct range Y of the Other from Own. The computer 17 measures the intervals, calculates the range or ranges, and applies the range data in association with respective identity and altitude data to an initial position computer 18.

Computer 18 receives, from computer 9, passive A, T, H and ID data regarding the Other station replying to interrogations sent by gound SSRs and from the computer 17, the computer 18 receives range, H and IP of Other stations replying to transmitter 16, and computes Own's position trigonometrically from these data. The direct range Y of Other from Own is provided by the computer 17. The Own position data is supplied to the Own position memory device 5 by way of a best geometry and position selector 18A, described below.

To initiate operation of the system, a rough estimate of Own's position to within say 30 miles is needed to enable the SSR selector 8 to set the PRC selectors in computer 9 to recognize and accept the interrogations of two or more SSRs in the general area, and the replies to said interrogations. Ordinarily this requirement is readily met by the output of the Own position memory device 5, which retains the last data available before the system was turned off. Otherwise, as when Own has been moved a substantial distance with the equipment not operating, the rough estimate may be entered in device 5 manually, for example.

To refine Own's estimated position much closer to its true position, transmitter 16 broadcasts a burst of repetitive interrogations, alternately coded for ID and altitude, with a PRC signature indistinguishable from that assigned any SSR. During transmission, the 1030 MHz receiver is inhibited. All Others within range will respond. In a relatively dense traffic situation, as in the vicinity of a major airport, many of Others' replies coming from different directions will overlap and garble each other, and be rejected by the correlator 2A because the reply messages do not correlate pulse to pulse with each other in response to the interrogations. A single burst may elicit clear ungarbled replies, as from one or more Others outside the immediate vicinity. If this does not occur, the burst is repeated at intervals of about one second. Four or less bursts should ordinarily result in correlated and thus ungarbled replies from at least one Other station. Such replies will be processed by computer 17 to provide associatively data regarding ID, altitude and direct range Y. Said data is applied to computer 18 for trigonometric determination of Own's position.

Figure 2:
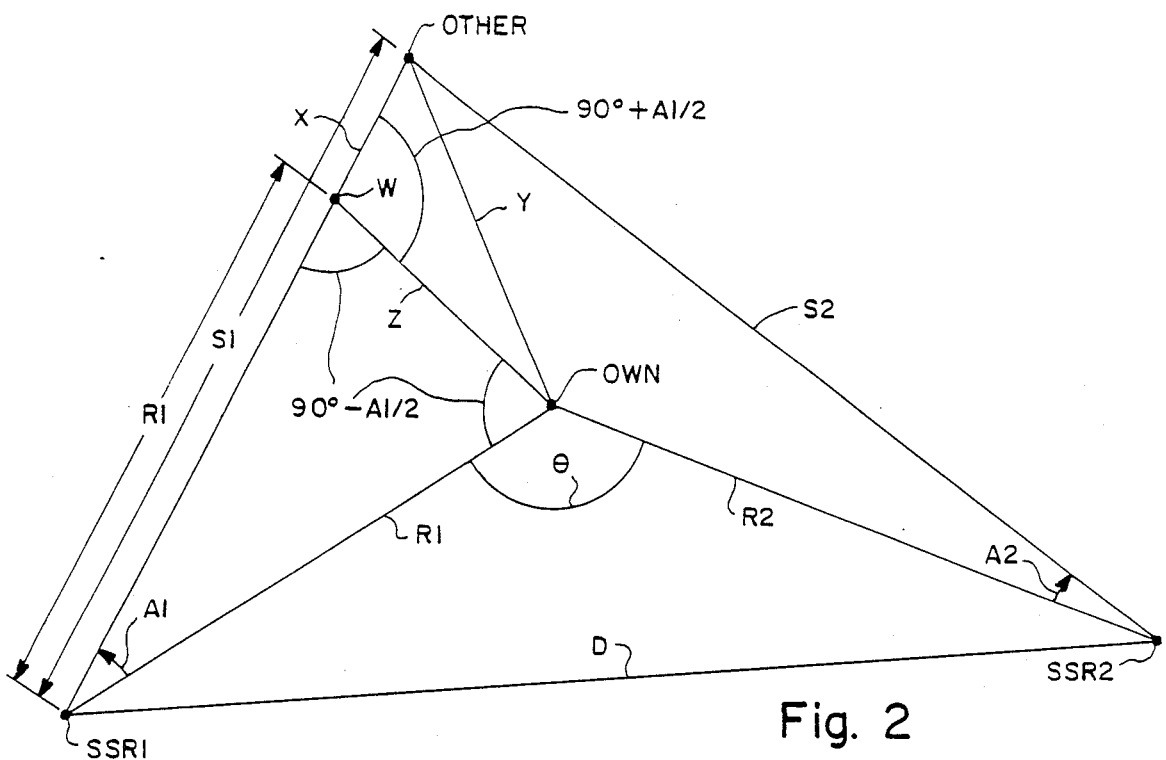
FIGS. 2-4 are geometric diagrams used in explaining the operation of the system of FIG. 1.

FIG. 2 is a plan or map-like representation of the known positions of two radars SSR 1 and SSR 2 and the (initially unknown) positions of Own and an Other station. The differential azimuths A1 and A2 between Own and Other with respect to SSR 1 and SSR 2 are determined by computer 9, as are also the differential times of arrival T1 and T2 at Own from Other and SSR 1 and SSR 2, respectively. The length and direction of the line D between the radars are known from the known positions of the radars. R1 and R2 are the lines of position of Own from SSR 1 and SSR 2 and S1 and S2 are those of Other from the radars. Y is the distance from Own to Other, initially determined by the computer 17. Then the differential time of arrival T1 is $$T1 = 1/c \, (S1 + Y - R1),$$

where c is the speed of radio wave propagation.

Taking T1, A1 and Y as known quantities for a given identified Other, the computer 18 solves the triangle formed by lines R1, S1 and Y as follows. Assuming Other is further than Own from SSR 1, as shown in FIG. 2, S1 is greater than R1. Let S1=R1+X. Thus, draw a line Z from Own to a point W on line S1 at a distance X from Other; point W is at a distance R1 from SSR 1. The line Z, together with line R1 and the portion of line S1 between SSR 1 and point W (of length R1), form an isosceles triangle with an apex angle A1. The angles adjacent line Z are each $90° - A1/2$.

It is thus apparent that the differential time of arrival T1, times the propagation speed c, equals X+Y. Therefore X=cT1−Y. The angle between X and Z is $90° + A1/2$. Knowing that angle and the lengths of sides X and Y, the triangle formed by lines X, Y and Z can be solved for the length of Z. Returning to the isosceles triangle, the length of line Z is $$2R1\cos(90° - A1/2).$$

Accordingly, $$R1 = Z/2\cos(90° - A1/2).$$

The triangle formed by lines R2, 22 and Y is solved the same way. Since the positions of SSR 1 and SSR 2 are known, the length and direction of line D is directly determinable in the SSR selector and D calculator 8, enabling solution of the triangle formed by lines R1, R2 and D and thereby determining the map position of Own.

D may be measured independently and compared with the first value of D which is calculated from data derived from the storage table of unit 4 as discussed above. Thus, since all the angles around Own's location except $\theta$ are directly determinable, $\theta$ can be computed in D calculator 19 by subtracting the sum of said angles from 360°. The triangle defined by R1, R2 and $\theta$ can then be solved for D.

The calculated D from SSR selector and D calculator 8 and the measured D from D calculator 19 are applied to comparator 20. The output of comparator 20, applied to the transmitter 16, indicates whether the measured D is substantially the same as the calculated D, a unique characteristic since all SSRs are non-uniformly spaced. If substantially the same, the comparator 20 output permits the transmitter 16 to be turned off, after Own's and Other's positions have been established, as discussed below. If the two Ds are not substantially the same, then the transmitter 16 continues operation and another pair of SSRs is selected. In other words, the comparison of the Ds assures that the correct solution of the triangles has occurred and the system can revert to full passive operation.

Figure 3:
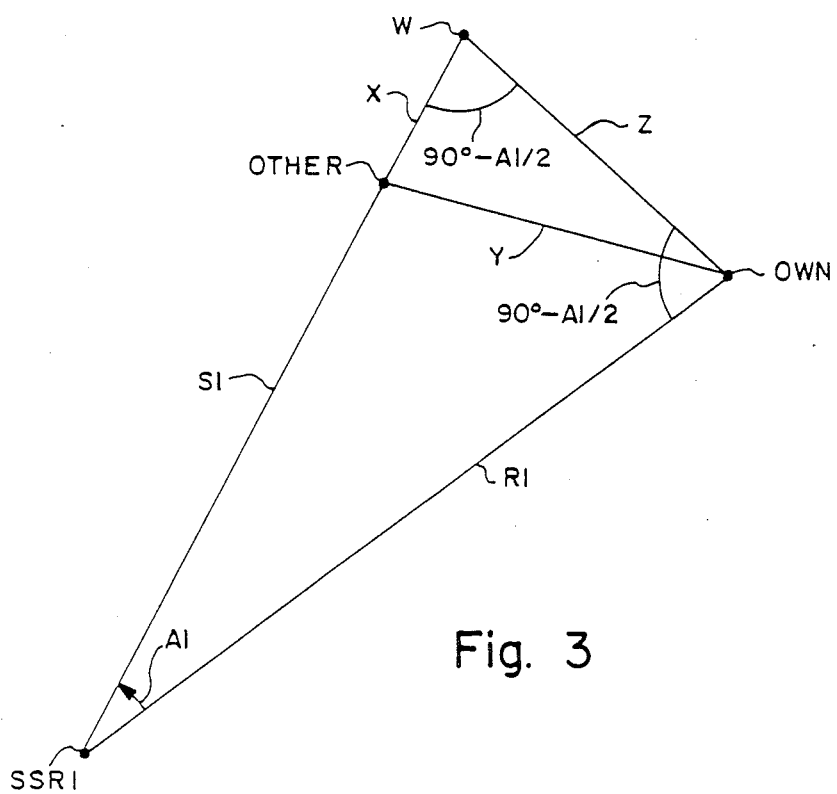

Assuming Own is futher than Other from SSR 1, as shown in FIG. 3, S1 is less than R1. Let R1=S1+X. Draw a line Z from Own to a point W on an extension of line S1 at a distance X beyond Other. The lines R1, Z and S1+X form an isosceles triangle. Knowing Y and the apex angle at point W, the triangle formed by lines X, Y and Z can be solved for Z. Knowing Z and the angle A1, the isosceles triangle may be solved for R1, as described above.

The foregoing method can yield two solutions, one representing the actual situation and the other not. The ambiguity is resolved here by recognizing that all SSRs rotate clockwise as viewed from above. Adopting the convention that differential azimuth is measured clockwise from Own to Other, the angle A1 in FIG. 2 is negative and A2 is positive.

Figure 4:
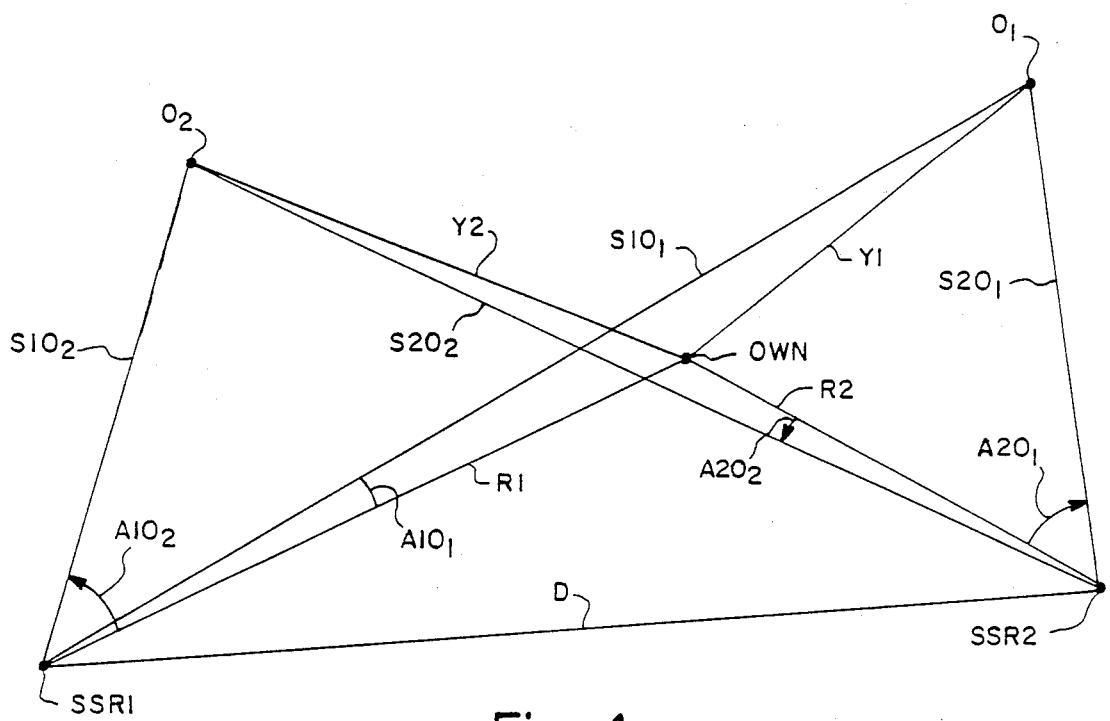

Although only one Other station is involved in the situation depicted in FIGS. 2 and 3, it is possible and usually likely that garble-free replies will be received from one or more additional Others, providing additional information useful in refining the determinations of position. Referring to FIG. 4, two Other stations are at positions designated $O_1$ and $O_2$. Their lines of position from SSR 1 are denoted $S1O_1$ and $S1O_2$ respectively. $S2O_1$ and $S2O_2$ are the lines of position from SSR 2. Y1 and Y2 are the direct ranges of $O_1$ and $O_2$ from Own. $A1O_1$ and $A1O_2$ are the differential azimuths of $O_1$ and $O_2$ with respect to SSR 1. $A2O_1$ and $A2O_2$ are the differential azimuths with respect to SSR 2.

First considering the Other station $O_1$, the triangle formed by lines R1, $S1O_1$ and Y1 can be solved as described with reference to FIGS. 2 and 3. However, because $A1O_1$ is quite small, said triangle is geometrically unfavorable for accurate determination of R1. The reason is that measurements of differential azimuth are subject to systemic errors of about plus or minus 0.3° degree; when A is small, say five degrees or less, the percentage error can be very large, seriously degrading the accuracy of positional determination, particularly when any of the distances R, S and Y are large.

The triangle relating to the Other station $O_1$, formed by lines R2, $S2O_1$ and Y1, is geometrically favorable, because $A2O_1$ is large. This triangle can be solved as described above to yield an accurate value of R2.

In like manner, the triangle relating to the Other station $O_2$, formed by lines R2, $S2O_2$, and Y2 is unfavorable, but the triangle formed by lines R1, $S1O_2$ and Y2 is favorable, and its solution will yield an accurate value of R1.

Returning to FIG. 1, the initial position computer 18 solves all the triangles, including the geometrically unfavorable ones, and presents them to selector 18A in association with the values of their respective differential azimuth angle values A. The selector compares the angles and selects the solutions associated with the largest values of A for storage in the Own position memory 5.

After Own's and Other's positions have thus been established, interrogator transmitter 16 is automatically turned off, computers 17 and 18 cease operation, and the rest of the system, operates passively like that of U.S. Pat. No. 4,768,036. The computer 11, using a known algorithm such as Kalman filtering, repeatedly updates Own's and Other's positions as subsequent passive data is supplied from the data buffer 10.

The transmitter 16 is automatically turned on again only when Own's position ceases to be updated. During a typical jet airliner flight path at sufficiently high altitudes such that line of sight is retained to two or more SSRs at all times, the transmitter 16 will not be restarted. Upon landing and taking off again, the transmitter is automatically turned on to initialize Own's position as described. The system remains passive on the order of 99% for most flight paths, thereby greatly minimizing the possibility of interference with the ATCRBS radars and transponders.

The passively computed Other position data relative to Own are subject to systemic errors and quantization effects. The resulting inaccuracies are generally small, and decrease with an increase in the number of participating Others and SSRs, thereby providing the highest accuracy in dense traffic environments, where it is most needed, without active transmissions. An error of say as much as a mile or so in Own's estimated or initially computed map position may appear when replies from only a single Other are not garbled. It can be shown that such an error, even in a two-radar environment, will have only small second order effects on the computed relative range, bearing and bearing rate of any Other from Own. Such relative positional data is sufficient for collision avoidance computations of Own to Other bearing angle changes, even without precise map position data.

In any viable airborne anti-collision system, bearing angle changes, measured accurately at Own aircraft as disclosed herein, of a closing Other aircraft, are critical to discriminating safely between a colliding and a non-colliding co-altitude Other aircraft.

I claim:

1. In a position-finding collision avoidance system at an Own station that passively derives differential azimuth (A), differential time of arrival (T), identity (ID) and altitude (H) data regarding transponder equipped Other stations utilizing standard ground ATCRBS interrogations and transponder replies thereto, and updates the positions of Own and Other stations for display at Own station, apparatus for initially establishing Own station's position, comprising:
   a. means for transmitting a brief burst of interrogations in standard ATCRBS format utilizing a signature and repetition rate substantially different from that of any SSR, b. means for receiving replies to said interrogations from all Other stations within range, c. means for selecting from said replies by the Other stations only those replies that are not garbled, d. means for determining the direct range Y from said Own station to one or more of said Other stations whose non-garbled replies correlate with the time intervals between said interrogations and the replies thereto, and e. means for computing the Own station's initial position from said one or more ranges Y, the known positions of the participating SSRs and the A, T, ID and H data derived from the standard ground ATCRBS interrogations from said SSRs and transponder replies thereto from said one or more Other stations.

2. The system of claim 1, wherein said means (c) includes a PRC selector designed to accept only replies that correlate with said interrogations transmitted from said Own station.

3. The system of claim 1, wherein said means (e) also computes the positions of participating Other stations.

4. The system of claim 1, further including means for selecting the computed positions based on the most favorable geometrical conditions, involving the largest differential azimuth angles.

5. The system of claim 1 or claim 3, further including means for automatically terminating operation of said means (a) immediately upon completion of the operation of said means (e).

6. In a position-finding collision avoidance system at an Own station that passively derives differential azimuth (A), differential time of arrival (T), identity (ID) and altitude (H) data regarding transponder equipped Other stations utilizing standard ground ATCRBS interrogations and transponder replies thereto, and updates the positions of Own and Other stations for display at Own station, the method of initially establishing Own's position, comprising the steps of:

a. transmitting a brief burst of interrogations in standard ATCRBS format utilizing a signature and repetition rate substantially different from that of any SSR, b. receiving replies to said interrogations from all Other stations within range, c. selecting from said replies by the Other stations only those replies that are not garbled, d. determining the direct range Y from said Own station to one ormore of said Other stations whose nongarbled replies correlate with the time intervals between said interrogations and the replies thereto, and e. computing the Own station's initial position from said one or more ranges Y, the known positions of the participating SSRs and the A, T, ID and H data derived from the standard ground ATCRBS interrogatories from said SSRs and transponder replies thereto from said one or more Other stations.

7. The method of claim 6, wherein said step (c) includes the step of accepting only replies that correlate with said interrogations transmitted from said Own station.

8. The method of claim 6, wherein said step (e) also includes the step of computing the positions of participating Other stations.

9. The method of claim 6, further including the step of selecting the computed positions based on the most favorable geometrical conditions, involving the largest differential azimuth angles.

10. The method of claim 6 or claim 8, further including the step of automatically terminating said step (a) immediately upon completion of said step (e).

11. Apparatus for determining the distance D between two SSRs at an Own station within the common service area of said SSRs, said service area also encompassing a transponder-equipped Other station, comprising:

a. means for transmitting interrogations from said Own station and receiving replies thereto from said Other station, b. means for determining the distance Y of said Other station from said Own station from the time delay between transmission of said interrogations and the reception of replies elicited thereby, c. means for deriving the differential azimuths (A) and the differential times of arrival (T) data regarding said Other station with reference to said SSRs, d. means for computing, from said data and said distance Y, the lengths of lines R1 and R2 from said Own station to said SSRs and the angle $\theta$ between said lines, and e. means for solving the triangle defined by said lines R1 and R2 and said angle $\theta$ for the side D opposite said angle $\theta$.

12. Apparatus as defined in claim 11, including means for comparing the measured side D value with a calculated D value derived from data of the SSR ground environment to assure correct selection of the SSRs.

13. The method of determining the distance D between two SSRs at an Own station within the common service area of said SSRs, said service area also encompassing a transponder-equipped Other station, including the steps of:

a. transmitting interrogations from said Own station and receiving replies thereto from said Other station, b. determining the distance Y of said Other station from said Own station from the time delay between transmission of said interrogations and the reception of replies elicited thereby, c. deriving the differential azimuths (A) and the differential times of arrival (T) data regarding said Other station with reference to said SSRs, d. computing, from said data and said distance Y, the lengths of lines R1 and R2 from said Own station to said SSRs and the angle $\theta$ between said lines, and e. solving the triangle defined by said lines R1 and R2 and said angle $\theta$ for the side D opposite said angle $\theta$.

14. The method of claim 13, further including the step of comparing the measured side D value with the calculated D value derived from the data of the SSR ground environment to assure correct selection of the SSRs.

* * * * *